(12) United States Patent
Kögel et al.

(10) Patent No.: US 7,423,893 B2
(45) Date of Patent: Sep. 9, 2008

(54) POWER SUPPLY HAVING TWO SWITCH-MODE POWER SUPPLY UNITS

(75) Inventors: Reinhard Kögel, Brigachtal (DE); Jean-Paul Louvel, Brigachtal (DE)

(73) Assignee: Thomson Licensing, Boulogne Billancourt (FR)

( * ) Notice: Subject to any disclaimer, the term of this patent is extended or adjusted under 35 U.S.C. 154(b) by 238 days.

(21) Appl. No.: 10/530,338

(22) PCT Filed: Sep. 29, 2003

(86) PCT No.: PCT/EP03/10802
§ 371 (c)(1), (2), (4) Date: Apr. 1, 2005

(87) PCT Pub. No.: WO2004/034358
PCT Pub. Date: Apr. 22, 2004

(65) Prior Publication Data
US 2007/0063589 A1  Mar. 22, 2007

(30) Foreign Application Priority Data
Oct. 11, 2002 (DE) ................. 102 47 475

(51) Int. Cl.
*H02M 7/68* (2006.01)
*H04N 5/63* (2006.01)

(52) U.S. Cl. ............. 363/89; 348/E5.127; 307/80

(58) Field of Classification Search ........... 363/89, 363/72, 71, 21.07, 21.04, 21.08, 97, 21.12, 363/21.15; 307/80, 83; 348/E5.127, 730; 323/207
See application file for complete search history.

(56) References Cited

U.S. PATENT DOCUMENTS

| | | | |
|---|---|---|---|
| 4,788,591 A | * 11/1988 | Decraemer | .......... 348/730 |
| 5,369,564 A | 11/1994 | Choi | |
| 5,852,550 A | * 12/1998 | Majid et al. | .......... 363/21.05 |
| 5,910,891 A | 6/1999 | Jo | |
| 5,920,466 A | * 7/1999 | Hirahara | .......... 363/21.02 |
| 5,949,660 A | 9/1999 | Rehm et al. | |
| 6,408,148 B1 | * 6/2002 | Yamamoto | .......... 399/88 |
| 6,462,437 B1 | * 10/2002 | Marmaropoulos et al. | .. 307/125 |

OTHER PUBLICATIONS

Search Report Dated Feb. 19, 2004.

* cited by examiner

*Primary Examiner*—Jeffrey L. Sterrett
*Assistant Examiner*—Harry Behm
(74) *Attorney, Agent, or Firm*—Joseph J. Laks; Harvey D. Fried

(57) ABSTRACT

A power supply has first and a second switch-mode power supply (SMPS) units, which both contain a transformer having a primary winding and at least one secondary winding, and a driver stage. The power supply furthermore has a normal operating mode, in which both SMPS units are in operation, and a standby operating mode, in which the first SMPS unit is switched off by a control voltage. In the standby mode, the control voltage is also used to reduce the switching frequency of the second SMPS unit, for example by means of a connection, which reduces the oscillation frequency of the oscillator of the second driver stage. In a preferred exemplary embodiment, the output of a first driver stage is furthermore connected via a series circuit to the oscillator input of a second driver stage, for synchronization purposes.

10 Claims, 2 Drawing Sheets

POWER SUPPLY HAVING TWO SWITCH-MODE POWER SUPPLY UNITS

Figure 1:
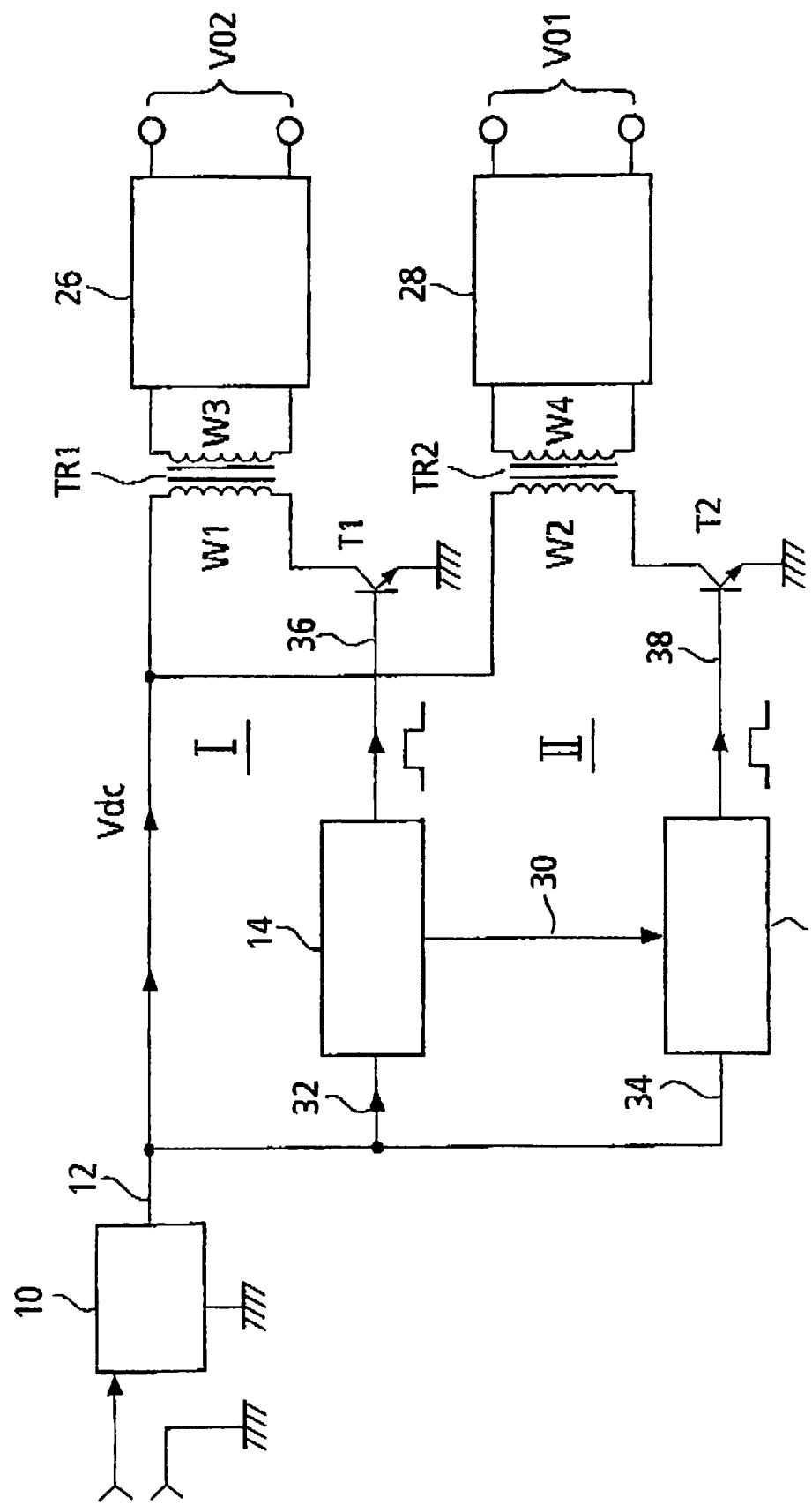

This application claims the benefit, under 35 U.S.C. § 365 of International Application PCT/EP03/10802, filed Sep. 29, 2003, which was published in accordance with PCT Article 21(2) on Apr. 22, 2004 in English and which claims the benefit of German patent application No. 10247475.3, filed Oct. 11, 2002.

The invention relates to a power supply having two switch-mode power supply units according to the preamble of claim 1. Power supplies of this type are used in devices appertaining to consumer electronics, in particular in television sets, video recorders and set-top boxes for generating a multiplicity of stabilized supply voltages.

PRIOR ART

Devices of this type often use switch-mode power supply units according to the flyback converter principle, in which a regulating loop is used to effect regulation to one of the output voltages. In this case, the switch-mode power supply unit has a transformer having a primary winding and at least one secondary winding, a switching transistor coupled to the primary winding, a driver circuit and a regulating circuit for controlling the switching transistor. By means of the regulating circuit, the driver circuit of the switching transistor is driven in such a way that the output voltage connected to the regulating loop is kept constant by means of, for example, a pulse width modulation (PWM) or a frequency variation of the control signal of the driver circuit. The further output voltages of the switch-mode power supply unit are also stabilized as a result of this.

If a device requires many supply voltages, then the switch-mode power supply unit has to have correspondingly many secondary windings for generating these supply voltages. Often, voltage regulators, in particular linear regulators, are also connected downstream of a secondary winding, by means of which a further supply voltage is provided or an improved stabilization can be achieved.

A further possibility for generating many supply voltages is to use a power supply having two switch-mode power supply units. It is desirable for cost reasons to use for both switch-mode power supply units as many identical components as possible, for example switching transistors and integrated circuits in the driver circuits. In order to avoid reciprocal interference, both switch-mode power supply units should be operated with precisely the same switching frequency. However, component tolerances mean that the switching frequency of the two switch-mode power supply units is not identical. If two switch-mode power supply units run with slightly different switching frequencies, however, then this can adversely affect the regulation of the two switch-mode power supply units. Therefore, it is desirable for the two switch-mode power supply units to be synchronized with one another.

U.S. Pat. No. 5,369,564 discloses a power supply having two switch-mode power supply units which are synchronized with one another. In this case, the oscillator of the second switch-mode power supply unit is synchronized with the first switch-mode power supply unit via the output of the driver stage of the first switch-mode power supply unit in such a way that the PWM voltages of the two driver stages have a phase shift of 180°. U.S. Pat. No. 5,130,561 discloses a further power supply having two switch-mode power supply units which are synchronized with one another.

A power supply having two switch-mode power supply units according to the prior art is illustrated in a simplified embodiment in FIG. 1. Both switch-mode power supply units I and II have a common input section 10 on the input side, which input section provides a filtered DC voltage Vdc. Both switch-mode power supply units in each case contain a transformer TR1 and TR2, respectively, whose primary windings W1 and W2 are in each case connected to the voltage Vdc. On the output side, the two transformers TR1 and TR2 have secondary windings W3 and W4, from the output voltages of which operating voltages V01 and V02 for a corresponding device are provided via filter sections 26 and 28.

The two switch-mode power supply units I and II furthermore in each case contain a switching element T1 and T2, respectively, for example a switching transistor or a MOSFET, and also a driver stage 14 and 16, respectively, for controlling the switching elements T1 and T2. The two driver stages 14 and 16 furthermore have a connection 32 and 34, respectively, to the input section 10, via which an operating voltage for the two driver stages 14 and 16 is provided. By means of a connection 30, a synchronization of the second switch-mode power supply unit II is effected by the driver stage 14 of the switch-mode power supply unit I.

In order to regulate the switch-mode power supply unit, the driver circuit is fed a regulating signal, not illustrated in FIG. 1, which is derived from one of the supply voltages on the secondary side and is transmitted via an optocoupler or an isolation transformer to the primary side of the switch-mode power supply unit. A switch-mode power supply unit according to the flyback converter principle which has output voltage regulation on the secondary side is described in U.S. Pat. No. 4,876,636, for example, to which reference is hereby made.

Power supplies for devices appertaining to consumer electronics often have a normal operation and a standby operation. In normal operation, the power supply operates with a high power and provides corresponding voltages for the device, so that all the functions of the device can be utilized by a user. In standby operation, as many circuit groups or assemblies of the device as possible are switched off in order to keep the consumption of the device as small as possible, and usually there is only an infrared receiver and a corresponding circuit logic, often a microprocessor, too, in operation, so that a user can switch the device from the standby operation to the normal operation by means of a remote control.

In the case of a power supply having two switch-mode power supply units, it is appropriate to switch off one of the two switch-mode power supply units, in particular the switch-mode power supply unit with the higher power, in standby operation and to operate the switch-mode power supply unit that is active in standby operation with the lowest possible power loss in standby operation. A power supply of this type is disclosed in EP-A-0 803 966, for example.

INVENTION

The object of the present invention is to specify a power supply having two switch-mode power supply units, which provides a multiplicity of supply voltages and has a high efficiency particularly in standby operation.

This object is achieved for a power supply by means of the features specified in claim 1. Advantageous developments of the invention are specified in the subclaims.

The power supply according to the invention has a first and a second switch-mode power supply unit, which both contain, in particular, in each case a transformer having a primary winding and at least one secondary winding, and which preferably operate according to the flyback converter principle. The power supply furthermore has a normal operation, in which both switch-mode power supply units are in operation, and a standby operation, in which the first switch-mode power supply unit is switched off by a control voltage. In this case, the control voltage is simultaneously used to reduce the switching frequency of the second switch-mode power supply unit in standby operation.

In a preferred exemplary embodiment, the output of the first driver stage which drives the switching element of the first switch-mode power supply unit is furthermore connected via a series circuit to the oscillator of the second driver stage, so that simple synchronization is thereby effected, At the same time, a switching stage, which connects the output of the second driver stage to the series circuit, is used to ensure that a high pulse width ratio can be used for a high power of the power supply in normal operation.

For switch-mode power supply units, it is desirable to work with a higher switching frequency since this makes it possible, in particular, to use a smaller transformer. A high switching frequency is unfavorable in standby operation, however, since, in this case, in particular the power loss of the switching transistor increases. According to the invention, therefore, both switch-mode power supply units can be operated with a switching frequency of 32 kHz, for example, in normal operation and the second switch-mode power supply unit can be operated with a switching frequency of 16 kHz in standby operation. If a suitable output of the driver stage of the first switch-mode power supply unit is used, then only a single resistor is required for switching over the switching frequency in standby operation.

The power supply is suitable in particular for digital television sets, video recorders and set-top boxes which require a multiplicity of supply voltages.

DRAWINGS

Figure 2:
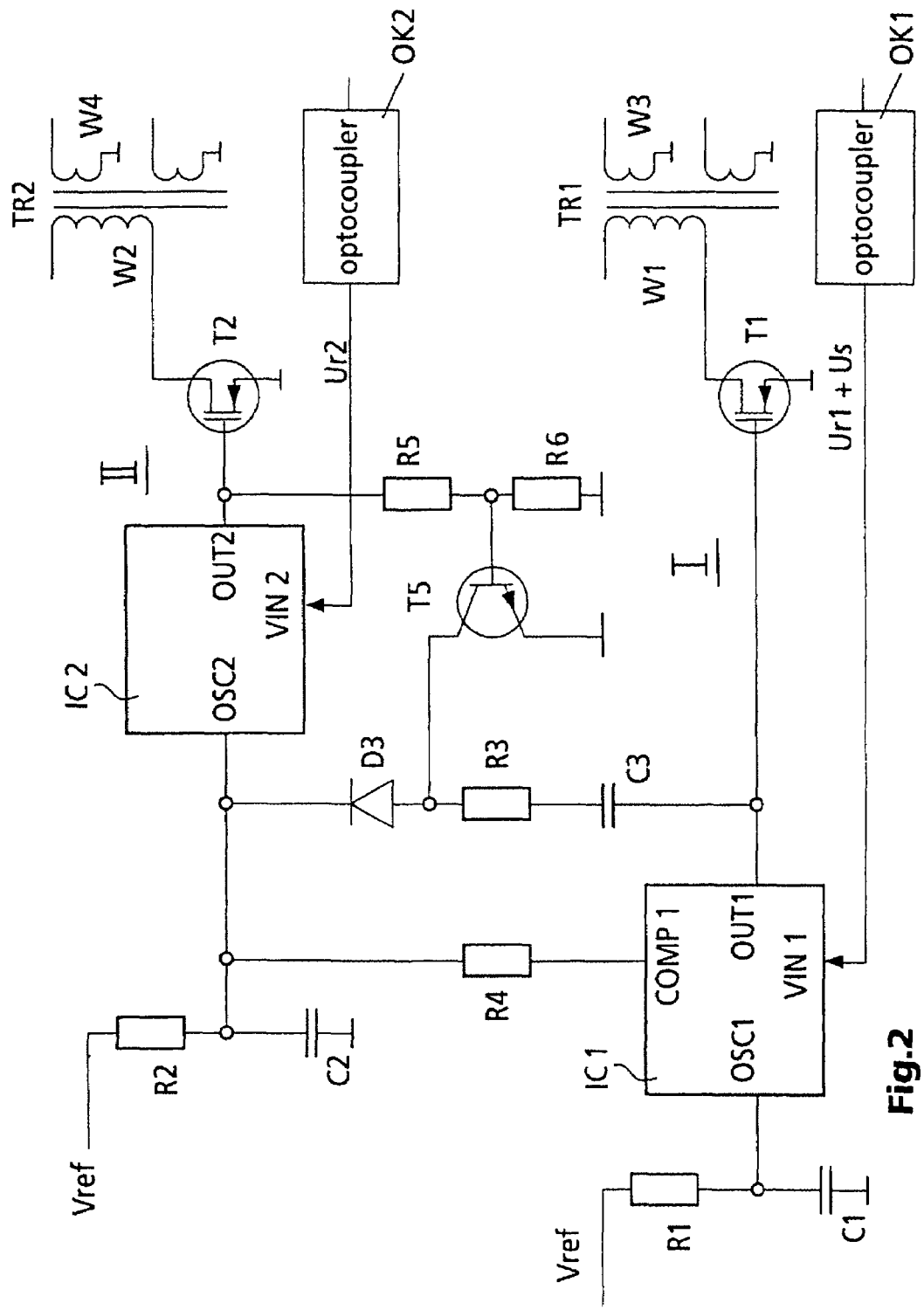

The invention is explained in more detail below by way of example using an exemplary embodiment which is illustrated schematically in FIG. 2. In the figures:

FIG. 1 shows a power supply having two switch-mode power supply units according to the prior art, and FIG. 2 shows a power supply having two switch-mode power supply units according to the invention.

PREFERRED EXEMPLARY EMBODIMENTS

FIG. 2 illustrates a power supply having two switch-mode power supply units I and II according to the invention, which are synchronized with one another. The synchronization is not absolutely necessary for both switch-mode power supply units, but it is recommended particularly in the case of a power supply with a high output power since the pulsed operation of the switching transistors gives rise to currents having high current peaks which can interfere with the regulation of the respective other switch-mode power supply unit.

In this case, the switch-mode power supply units I and II correspond in their basic principle to the switch-mode power supply units I and II of FIG. 1 and are likewise operated with mains voltage on the input side. Therefore, identical components are designated by identical reference symbols. The two switch-mode power supply units I, II of FIG. 2 operate, in particular, according to the principle of the flyback converter. Essential circuit groups such as starting circuit and snubber network, for example, have been omitted for the sake of clarity.

The switch-mode power supply unit I has a driver stage, in this exemplary embodiment an integrated circuit IC1, whose output OUT1 drives the switching transistor T1 coupled to the primary winding W1. The integrated circuit IC1 has an oscillator input OSC1, which can be used to set the frequency of the oscillator of the integrated circuit. In this case, the oscillation frequency of the oscillator determines the switching frequency of the switching transistor T1. Switch-mode power supply units according to the flyback converter principle often use a constant switching frequency; this is the expedient alternative in particular also in the case of two switch-mode power supply units which are synchronized with one another.

For driver stages which use a fixed switching frequency there are a multiplicity of integrated circuits available, for example the UC3845B type from the company Motorola. Connected to the oscillator input OSC1 of the integrated circuit IC1 is an RC element having a resistor R1 and a capacitor C1, the time constant of which prescribes the oscillation frequency. Connected to the RC element is a constant voltage Vref, which can be tapped off for example at a further output of the integrated circuit IC1. In this exemplary embodiment, the second switch-mode power supply unit II likewise has an integrated circuit IC2, an RC element having a resistor R2 and a capacitor C2 being connected to the oscillator input OSC2 of said integrated circuit.

Both switch-mode power supply units I and II have mutually independent regulations for an output voltage on the secondary side. In the case of the switch-mode power supply unit I, by way of example, regulation to a constant output voltage of the second winding W3 is effected and, in the case of the switch-mode power supply unit II, regulation to a constant output voltage of the secondary winding W4 is effected. In this case, the regulating signals Ur1 and Ur2 are transmitted to the primary side via an optocoupler OK1 for the switch-mode power supply unit I and via an optocoupler OK2 for the switch-mode power supply unit II and are applied to corresponding inputs VIN1 and VIN2 of the driver circuits. By means of the regulating voltages Ur1 and Ur2, the driver circuits IC1, IC2 vary the pulse width ratio for the two switching transistors T1 and T2, depending on the loading on the respective switch-mode power supply unit.

Both switch-mode power supply units I and II are in operation in normal operation and the switch-mode power supply unit I is switched off in standby operation. This is brought about as follows: the regulating signal Ur1 transmitted via the optocoupler OK1 is present at the input VIN1 of the integrated circuit IC1, to which input an error amplifier is connected internally. The error amplifier compares the regulating voltage Ur1 with an internal reference voltage and controls the switching transistor T1 in such a way that the switch-mode power supply unit I transmits a higher power if Ur1 is too low, and transmits no power if Ur1 lies above the internal reference voltage. The output voltage of the switch-mode power supply unit I to which regulation is effected therefore fluctuates periodically about its desired value.

The input VIN1 can therefore be used to completely switch off the switch-mode power supply unit I: on the secondary side, a control voltage Us is added to the regulating signal Ur1, through which control voltage the voltage at the input VIN1 permanently lies above the internal reference voltage. This simulates an overvoltage at the output of the switch-mode power supply unit I, as a result of which the integrated circuit IC1 switches off completely. The output of the error amplifier is then permanently at zero, as a result of which no further output pulses are output at the output OUT1 of the integrated circuit IC1.

In many integrated circuits, such as the UC3845B type, for example, the output of the error amplifier is passed out via a terminal, in this case COMP1. Therefore, at the COMP1 output, a different output signal is present in standby operation than during normal operation. As a result of this, this output can be utilized to reduce the switching frequency of the switch-mode power supply unit II. The COMP1 output is therefore connected to the oscillator input OSC2 of the driver stage of the switch-mode power supply unit II, in this exemplary embodiment an integrated circuit IC2. The connection is effected by a resistor R4 in this exemplary embodiment. Since the COMP1 output is at zero potential in standby operation, the capacitor C2 connected to the OSC2 input is loaded via the resistor R4. The charging cycles which are defined by the values of the resistor R2 and of the capacitor C2 are thereby lengthened temporally in standby operation.

Through a suitable choice of the resistance of R4, the switching frequency of the switch-mode power supply unit II can therefore be reduced in a desired manner in standby operation, for example from a switching frequency of 32 kHz in normal operation to a frequency of 16 kHz. In this case, the frequency shifting from 32 kHz to 16 kHz is not brought about solely by the resistor R4: since the switch-mode power supply unit II is synchronized by the switch-mode power supply unit I in normal operation, the original oscillator frequency of the switch-mode power supply unit II is chosen to be somewhat lower than the envisaged switching frequency in normal operation, so that the switching frequency of the switch-mode power supply unit II is increased somewhat by the synchronization. The reason is as follows: it is necessary to avoid the situation in which the original switching frequency of the switch-mode power supply unit II is higher than the switching frequency of the switch-mode power supply unit I, since a somewhat higher switching frequency cannot be synchronized to a lower switching frequency.

For synchronization purposes, the output OUT1 of the integrated circuit IC1 is connected to the OSC2 terminal of the integrated circuit IC2 by a series circuit. The series circuit has, in particular, a rectifier means and a current limiting means, in this case a diode D3, a resistor R3 and a capacitor C3, in such a way that a switching pulse of the output OUT1 raises the voltage across the capacitor C2 up to the upper threshold value. This initiates the discharging of the capacitor C2 via the OSC2 input.

In this exemplary embodiment, the integrated circuit UC3845B is used for both switch-mode power supply units I and II, in the case of which integrated circuit the pulse width ratio is limited to a maximum of 50%. This is brought about in the integrated circuit by switching pulses being generated at the output OUT1, OUT2 only during every second oscillator period. Therefore, an oscillator frequency of 64 kHz is necessary for a switching frequency of 32 kHz. The oscillator therefore supplies two oscillator periods for one switching period, which are both of the same length in unsynchronized fashion, and in which the on phase of the switching transistor takes place only during one oscillation period, while the switching transistor remains turned off in the other oscillation period. This integrated circuit is therefore suitable in particular for use in switch-mode power supply units according to the flyback converter principle.

In this case, the oscillator of the integrated circuit IC2 functions as follows: the capacitor C2 is charged by a constant reference voltage Vref via the resistor R2. Given an upper threshold value of 3.2 V, the capacitor C2 is discharged via the OSC2 input down to a lower threshold value of 1.6 V. The discharge current is 8 mA, for example, so that the capacitor C2 is discharged very rapidly. The next oscillator cycle then follows. During every second oscillator cycle, when the lower threshold value is reached, the integrated circuit IC2 generates an output pulse for driving the switching transistor T2.

Since a switching pulse of the integrated circuit IC1 charges the capacitor C2 up to the upper threshold value via the series circuit, and the subsequent discharging occurs very rapidly, and the switching pulse for the switching transistor T2 is generated at the lower threshold value of the integrated circuit IC2, the switch-mode power supply unit II thus runs with a small phase shift in lagging fashion with respect to the switch-mode power supply unit I. The current limiting means, in this case a capacitor C3 and a resistor R3, are chosen in such a way that the output OUT1 is loaded as little as possible by the series circuit, but at the same time a rapid charging of the capacitor C2 up to the upper threshold value is ensured.

Since the switch-mode power supply unit II thus has two oscillation cycles for one switching cycle of the switching transistor T2, the synchronization pulse of the switch-mode power supply unit I may fall either within the oscillation cycle which determines the on phase of the switching transistor T2, or within the oscillation cycle which determines the off phase of the switching transistor T2. If the synchronization pulse occurs during the on phase at the capacitor C2, then the oscillation cycle is ended early by the synchronization pulse and, as a result of this, so to is the on phase of the switching transistor T2. The pulse width ratio for the switching transistor T2 is thus restricted as a result of this.

If the synchronization pulse occurs in the oscillation cycle in which the switching transistor T2 is turned off, then this is more favorable since an oscillation cycle for the on phase then follows which is undisturbed, so that a pulse width ratio of at least 50% is possible in this case. The synchronization in this case shortens the off phase of the oscillation cycle and thus lengthens the maximum pulse width ratio to more than 50% in total. This would be the more favorable mode of synchronization, therefore, although after the power supply has been switched on, the synchronization can be effected either to the first oscillator cycle or to the second oscillator cycle. This cannot be defined by the external components.

The power supply therefore additionally contains a switching stage, which connects the output OUT2 of the driver stage IC2 to the series circuit, and by means of which the second switch-mode power supply unit II can be put at the more favorable oscillation cycle. In this exemplary embodiment, the switching stage has a transistor T5, whose base is connected via a voltage divider to resistors R5, R6 at the output OUT2 of the integrated circuit IC2, so that the transistor T5 turns on if the voltage level at the OUT2 output is high, and turns off if the level is low.

In this case, the output OUT2 of the integrated circuit IC2 is connected to the series circuit, or to the oscillator input OSC2, by the switching stage in such a way that the switching stage suppresses synchronization pulses of the integrated circuit IC1 if the output OUT2 supplies a high voltage for turning on the switching transistor T2. Therefore, after the power supply has been switched on, said synchronization pulses are suppressed, and only if the synchronization pulses fall within the oscillator cycle in which the switching transistor T2 is turned off are they transmitted by the series circuit, since, in this case, the transistor T5 turns off and is therefore at high impedance.

When the power supply is switched on to normal operation, the switch-mode power supply unit II is not immediately synchronized as a result of this if the synchronization pulse falls within the oscillator cycle in which the switching transistor T2 is turned on. As a result of the different oscillation frequencies, however, the phase of the synchronization pulse is then shifted until the pulse falls within the oscillation cycle in which the switching transistor T2 is turned off, so that the synchronization is effective for the switch-mode power supply unit II starting from this point in time. This ensures that the switch-mode power supply unit II can operate with a pulse width ratio of at least 50%.

The values used in the exemplary embodiment for the components are as follows: $C1=2.2$ nF, $R1=15$ kohm, $R2=18$ kohm, $C2=2.2$ nF, $R3=100$ ohm, $C3=1$ nF, $R4=55$ kohm, $R5=R6=1$ kohm.

The two switch-mode power supply units I and II according to FIG. 2 preferably operate according to the flyback converter principle, but other circuit principles are likewise possible. Flyback converters are preferably used in devices appertaining to consumer electronics, for example in television sets and video recorders. In a flyback converter, energy is stored in the transformer in this case during the on phase of the switching transistor and is subsequently transmitted to the windings on the secondary side in the off phase of the switching transistor.

The present invention is not restricted to the concrete embodiment of the power supply described here. Thus, the power supply may also have more than two switch-mode power supply units which are synchronized with one another, a first switch-mode power supply synchronizing the further switch-mode power supply units. Further configurations of the invention lie within the technical abilities of a person skilled in the art.

The invention claimed is:

1. A power supply, comprising:
   first and second switch-mode power supply units;
   both said first and second switch-mode power supply units operate during normal operation of said power supply;
   said first switch-mode power supply unit is switched off responsive to a control voltage during standby operation of said power supply;
   a first driver stage in said first switch-mode power supply unit, said first driver stage having a first output having a higher voltage during said normal operation than during said standby operation; and,
   said first output is coupled to an oscillator input of said second switch-mode power supply unit, said first output and the control voltage being used in standby operation for reducing the switching frequency of said second switch-mode power supply unit.

2. The power supply as claimed in claim 1, wherein the control voltage is transmitted via an optocoupler together with a regulating voltage for the first switch-mode power supply unit from the secondary side to the primary side.

3. The power supply as claimed in claim 1, wherein:
   the first driver stage is embodied in an integrated circuit and the first output of the first driver stage is the output of an error amplifier in said integrated circuit; and,
   said first output is connected via a resistor to a capacitor of the oscillator of the second switch-mode power supply unit.

4. The power supply as claimed in claim 1, wherein:
   a second driver stage forms part of said second switch-mode power supply unit; and,
   a second output of the first driver stage of the first switch-mode power supply unit, which drives the switching element of the first switch-mode power supply unit, is coupled by a series circuit, having a current limiter and a rectifier, to an oscillator input of the second driver stage of the second switch-mode power supply unit for synchronizing the second switch-mode power supply unit.

5. The power supply as claimed in claim 4, wherein the second output of the first driver stage of the first switch-mode power supply unit is connected by the series circuit to a capacitor of the oscillator of the second switch-mode power supply unit.

6. The power supply as claimed in claim 4, wherein an output of the second driver stage of the second switch-mode power supply unit is coupled by a switching stage to the series circuit for increasing a pulse width ratio of the second output of the first driver stage of the first switch-mode power supply unit.

7. The power supply as claimed in claim 6, wherein the switching stage has a transistor, which turns off if the voltage of the output of the second driver stage turns off the switching transistor being connected downstream, and which is at low impedance on the output side if the output voltage of the second driver stage is high.

8. The power supply as claimed in claim 6, wherein the switching stage blocks signals of the series circuit if the output voltage of the second driver stage is high.

9. The power supply as claimed in claim 1, wherein the first and second switch-mode power supply units in each case have a transformer having a primary winding and at least one secondary winding, a switching element coupled to one of the primary windings, and a driver stage, and in that both switch-mode power supply units operate according to the flyback converter principle.

10. The power supply as claimed in claim 1, wherein the control voltage is coupled to a control input of the first switch-mode power supply unit and an oscillator input of the second switch-mode power supply unit.

* * * * *